US006327566B1

(12) United States Patent
Vanbuskirk et al.

(10) Patent No.: US 6,327,566 B1
(45) Date of Patent: Dec. 4, 2001

(54) METHOD AND APPARATUS FOR CORRECTING MISINTERPRETED VOICE COMMANDS IN A SPEECH RECOGNITION SYSTEM

(75) Inventors: Ronald E. Vanbuskirk, Indiantown; James R. Lewis, Delray Beach, both of FL (US); Kerry A. Ortega, Raleigh, NC (US); Huifang Wang, Boynton Beach, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/333,698

(22) Filed: Jun. 16, 1999

(51) Int. Cl.[7] .......................... G10L 15/04; G10L 15/08; G10L 15/18; G10L 15/26
(52) U.S. Cl. ......................... 704/257; 204/251; 204/235; 204/231
(58) Field of Search ................. 704/9, 270, 251, 704/231, 275

(56) References Cited

U.S. PATENT DOCUMENTS

| | | | |
|---|---|---|---|
| 5,239,617 | * | 8/1993 | Gardner et al. ............... 704/9 |
| 5,794,196 | * | 8/1998 | Yegnanarayanan et al. ..... 704/255 |
| 5,875,429 | * | 2/1999 | Douglas ...................... 704/275 |
| 5,960,384 | * | 9/1999 | Brash ......................... 704/235 |

OTHER PUBLICATIONS

JustVoice™ (Interactive Products Inc., "Voice Recognition for MS Windows 93," © 1995, pp. 22–26).*
VoiceExpress™ (Lernout & Hauspie, "Installation & Getting Started Guide," © 1992–1999, pp. 29–34).*
VoiceAssist™ (Creative Labs, "User Guide," © 1993, pp. 4–4 to 4–8.*

* cited by examiner

Primary Examiner—Richemond Dorvil
Assistant Examiner—Daniel A. Nolan

(57) ABSTRACT

An efficient method and system, particularly well-suited for correcting natural language understanding (NLU) commands, corrects spoken commands misinterpreted by a speech recognition system. The method involves a series of steps, including: receiving the spoken command from a user; parsing the command to identify a paraphrased command; displaying the paraphrased command; and accepting corrections of the paraphrased command from the user. The paraphrased command is segmented according to command language categories, which include a command action category, an action object category, and an action and/or object modifying category. The paraphrased command is displayed in a user interface window segmented into these command language categories. The user interface window also contains alternative commands for each segment of the paraphrased command.

15 Claims, 4 Drawing Sheets

METHOD AND APPARATUS FOR CORRECTING MISINTERPRETED VOICE COMMANDS IN A SPEECH RECOGNITION SYSTEM

CROSS REFERENCE TO RELATED APPLICATIONS

STATEMENT REGARDING FEDERALLY SPONSORED RESEARCH OR DEVELOPMENT

BACKGROUND OF THE INVENTION

1. Technical Field

This invention relates to the field of computer speech recognition and more particularly to a method and system for correcting incorrectly recognized voice commands.

2. Description of the Related Art

Speech recognition is the process by which an acoustic signal received by microphone is converted to a set of text words by a computer. These recognized words may then be used in a variety of computer software applications for purposes such as document preparation, data entry and command and control.

With regard to command recognition, in the simplest possible command and control grammar, each function that the system can perform has no more than one speech phrase associated with it. At the other extreme is a command and control system based on natural language understanding (NLU). In an NLU system, the user can express commands using natural language, thereby providing total linguistic flexibility in command expression. Current command and control systems are beyond the simple one-function-one-speech-phrase grammar and are beginning to incorporate NLU.

Speech recognition systems, including NLU systems, have a difficult time accurately recognizing all the words spoken by a user. Speech recognition systems may incorrectly recognize words due to the dictation techniques and wide variety of pronunciations, accents and divergent speech characteristics of each individual speaker. For example, the speaker may speak very rapidly or softly, slur words or mumble. When transcribing speech dictation, this may result in: spoken words being converted into different words ("hold" recognized as "old"); improperly conjoined spoken words ("to the" recognized as "tooth"); and spoken words recognized as homonyms ("boar" instead "bore"). However, when controlling and navigating through speech-enabled applications by voice, incorrect recognition or non-recognition typically results in the execution of unintended commands or no command at all.

To rectify incorrectly recognized voice commands, conventional speech recognition systems include a user-initiated interface or window containing a list of possible commands. The list may be a listing of the entire speech command vocabulary, or a partial listing constrained by acoustic, language or context modeling techniques known in the art. The constrained lists are much more user friendly, since the speaker does not have to read through a lengthy list to find an intended command. These constrained lists can be generated, for example, by executing an algorithm, as is known in the art, one much like a spell checking program in word processing applications, to search a command grammar for words with similar characteristics as the incorrectly recognized words. Once the list is generated, the user may select the intended command by voice or input device. Alternatively, the user may key in the desired command in a text field within the user interface.

These command-listing methods can be effective for standard speech recognition systems, both informing the speaker of available and likely voice commands, as well as providing a simple means of executing the command. However, for NLU systems and more sophisticated systems that can recognize many hundreds of commands, command listing is impractical and cumbersome. For example, an NLU system may recognize spoken commands such as: "open the file please."; would you kindly get the file for me?; "hey, computer, open the filet"; and "I want to see the contents of the file." As can be seen, the phrasing can vary greatly and the numerous possible commands for performing each desired function would be too great to list.

Accordingly, there is a need to provide a quick and simple method of correcting incorrectly recognized voice commands in speech recognition systems, and for natural language understanding systems in particular.

SUMMARY OF THE INVENTION

The present invention provides a method and system for correcting incorrectly recognized commands that is particularly well-suited to natural language commands.

Specifically, the present invention operates on a computer system that is adapted for speech recognition to recognize voice commands for controlling a speech-enabled application running on the system. The method and system is performed by receiving a spoken command from a user and parsing the command to identify a paraphrased command. The paraphrased command is displayed to the user and user corrections to the paraphrased command are accepted.

The present invention provides the object and advantage of a quick and simple method of correcting incorrectly recognized commands. After being spoken, each command is parsed and a paraphrased command is generated. If the speech recognition system is unfamiliar with the spoken command, a mis-recognized command will be generated, which can subsequently be corrected by the user. Thus, the speaker will not have to re-dictate commands that are not recognized by the system. Moreover, the present invention provides another object and advantage in that it can be employed in speech recognition systems with natural language understanding capability to correct. incorrectly recognized natural language commands.

The method and system of the present invention segments the paraphrased command according to command language categories, including at least one of a command action category indicating an action to be performed; an action object category indicating an application element subjected to the action; and a modifier category indicating modifications to the action or object. The present invention can also identify alternative voice commands for each command language segment of the paraphrased command. The paraphrased command is displayed in a user interface window in the segmented form. And, alternate commands for the recognized commands of each segment are displayed as a pop-up text window, a floating text window or a drop-down menu. The user can use an input device, such as a mouse, to select an appropriate alternative.

Yet another object and advantage is provided by the present invention in that the categorical segmenting of the recognized and paraphrased command along with the alternatives for each segment can reduce the thousands of possible word combinations in sophisticated recognition systems to several small and manageable sets. Still another object and advantage to this invention is that it provides for quick, accurate corrections, since the user can select the intended command simply by pointing and clicking without typing.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1:
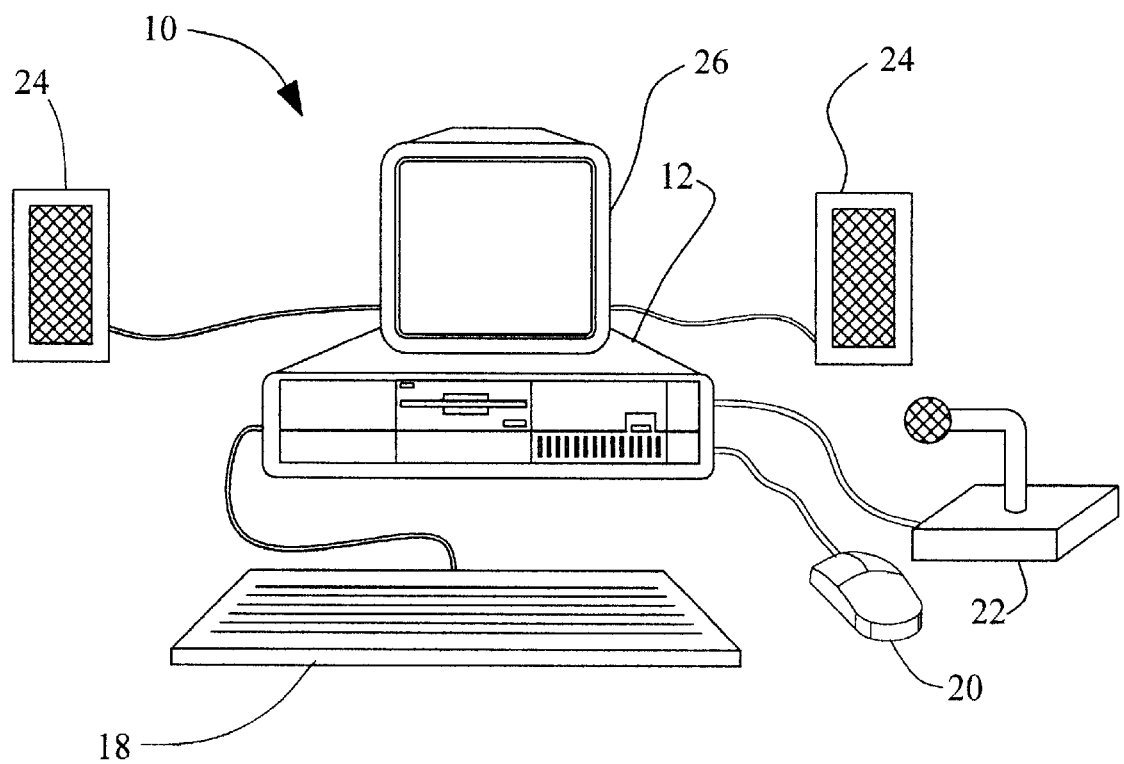
FIG. 1 shows a computer system for speech recognition with which the method and system of the present invention may be used.

Referring to the drawings in detail, wherein like reference characters represent corresponding elements throughout the several views, more specifically referring to FIG. 1, a computer system with which the present invention may be practiced is referred to generally by reference number 10. The computer system 10 is preferably comprised of a computer 12 having a central processing unit 14 (FIG. 2), at least one memory device 16 and related electronic circuitry (not shown). The computer system 10 also includes user input devices, a keyboard 18 and a pointing device 20, a microphone 22, audio loud speakers 24, and a video display 26, all of which are operatively connected to the computer 12 via suitable interface circuitry. The pointing device 20 and loud speakers 24 may be a part of the computer system 10, but are not required for the operation of the invention.

Generally, the computer system 10, as described above, can be satisfied by any one of many high-speed multi-media personal computers commercially available from manufacturers such as International Business Machines Corporation, Compaq, Hewlett Packard, or Apple Computers. The memory devices 16 preferably include an electronic random access memory module and a bulk storage device, such as a magnetic disk drive. The central processing unit 14 may include any suitable processing chip, such as any of the Pentium family microprocessing chips commercially available from Intel Corporation.

Figure 2:
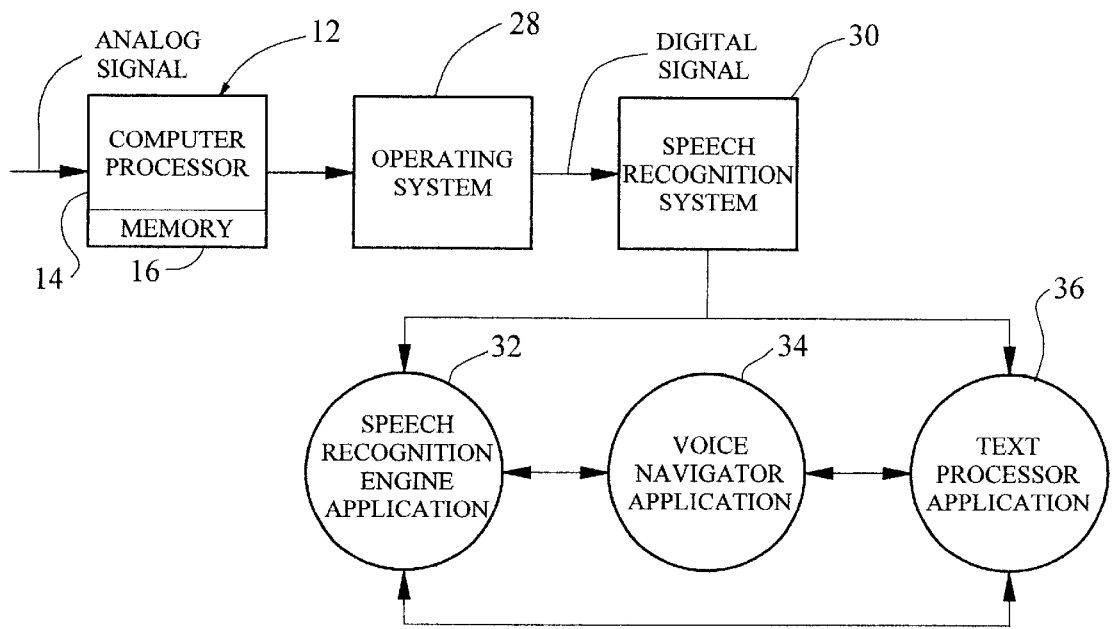
FIG. 2 is a block diagram showing a typical architecture for the computer system of FIG. 1 having a speech recognition engine.

Referring to FIG. 2, which illustrates a typical architecture for a computer system 10 adapted for speech recognition, the system includes an operating system 28 and a speech recognition system 30. The speech recognition system 30 includes a speech recognition engine application 32 and a voice navigation application 34. A speech text processor application 36 may also be included. However, the invention is not limited in this regard and the speech recognition engine application 32 can be used with any other application program which is to be voice enabled.

In FIG. 2, the speech recognition engine 32, voice navigator 34 and text processor 36 are shown as separate application programs. It should be noted, however, that these applications could be implemented as a single, more complex application. Also, the system 30 may be modified to operate without the text processor application 36, if the speech recognition system 30 is to be used solely for command and control.

In a preferred embodiment, the operating system 28 is one of the Windows family of operating systems, such as Windows NT, Windows '95 or Windows '98, which are available from Microsoft Corporation of Redmond, Washington. The present invention is not limited in this regard, however, as it may also be used with any other type of computer operating system.

Referring still to FIG. 2, in general, an analog audio signal containing speech commands is received by the microphone 22 and processed within the computer 12 by conventional audio circuitry, having an analog to digital converter, which produces a digitized form of the signal. The operating system 28 transfers the digital command signal to the speech recognition system 30, where the command is recognized by the speech recognition engine 32.

Figure 3:
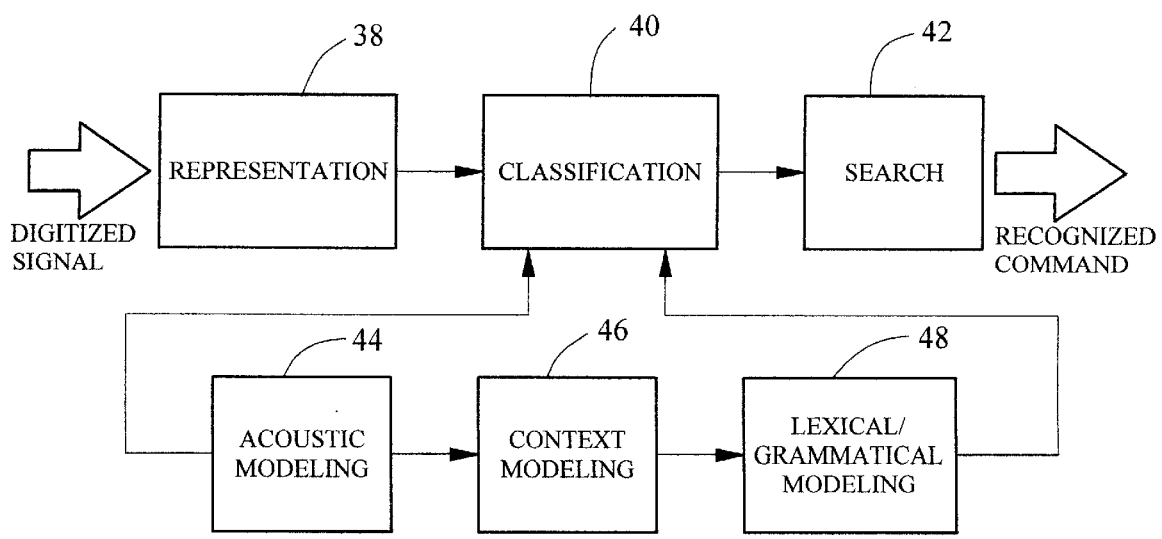
FIG. 3 is a block diagram showing the architecture for a speech recognition engine using multiple constraints in the recognition process.

Referring now to FIG. 3, the speech recognition engine 32 receives the digitized speech signal from the operating system 28. The signal is subsequently transformed in representation block 38 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In classification block 40, the processed speech command signal is used to identify, from the entire set of control commands, a subset of probable commands corresponding to the digitized speech command. This subset of probable commands is searched at block 42 to obtain the recognized command.

Referring still to FIG. 3, classification block 40 is preferably performed by acoustic modeling block 44, context modeling block 46 and lexical/grammatical modeling block 48. At acoustic modeling block 44, algorithms process the speech command signal to adapt speaker-independent acoustic models, contained in memory 16, to the acoustic signal of the current speaker and identify one or more probable matching commands.

At block 46, additional algorithms process the command signal according to the current state of the computer system as well as context events, including prior commands, system control activities, timed activities, and application activation, occurring prior to or contemporaneously with the spoken command. Specifically, these data structures include activities such as: user inputs by voice, mouse, stylus or keyboard; operation of drop-down menus or buttons; the activation of applications or applets within an application; prior commands; and idle events, i.e., when no activity is logged in an event queue for a prescribed time period. The system states and events can be analyzed, using statistical modeling techniques, to identify one or more probable commands matching the context in which the command was given.

At block 48, known algorithms conform the digitized speech command to lexical and grammatical models. These models are used to help restrict the number of possible words corresponding to a speech signal according a word's use in relation to neighboring words. The lexical model is simply a vocabulary of words understood by the system. The grammatical model, sometimes referred to as a language model, may be specified simply as a finite state network, where the permissible words following each word are explicitly listed, or may be implemented in a more sophisticated manner making use of context sensitive grammar, as is known in the art.

In its preferred embodiment, the present invention includes all three of the above described modeling techniques. However, the invention is not limited in this regard and can be performed using more or less modeling techniques. For example, it may be practiced without the event-based context modeling step. Also, each modeling technique may be performed discretely from, or interdependently with, the other models.

Figure 4:
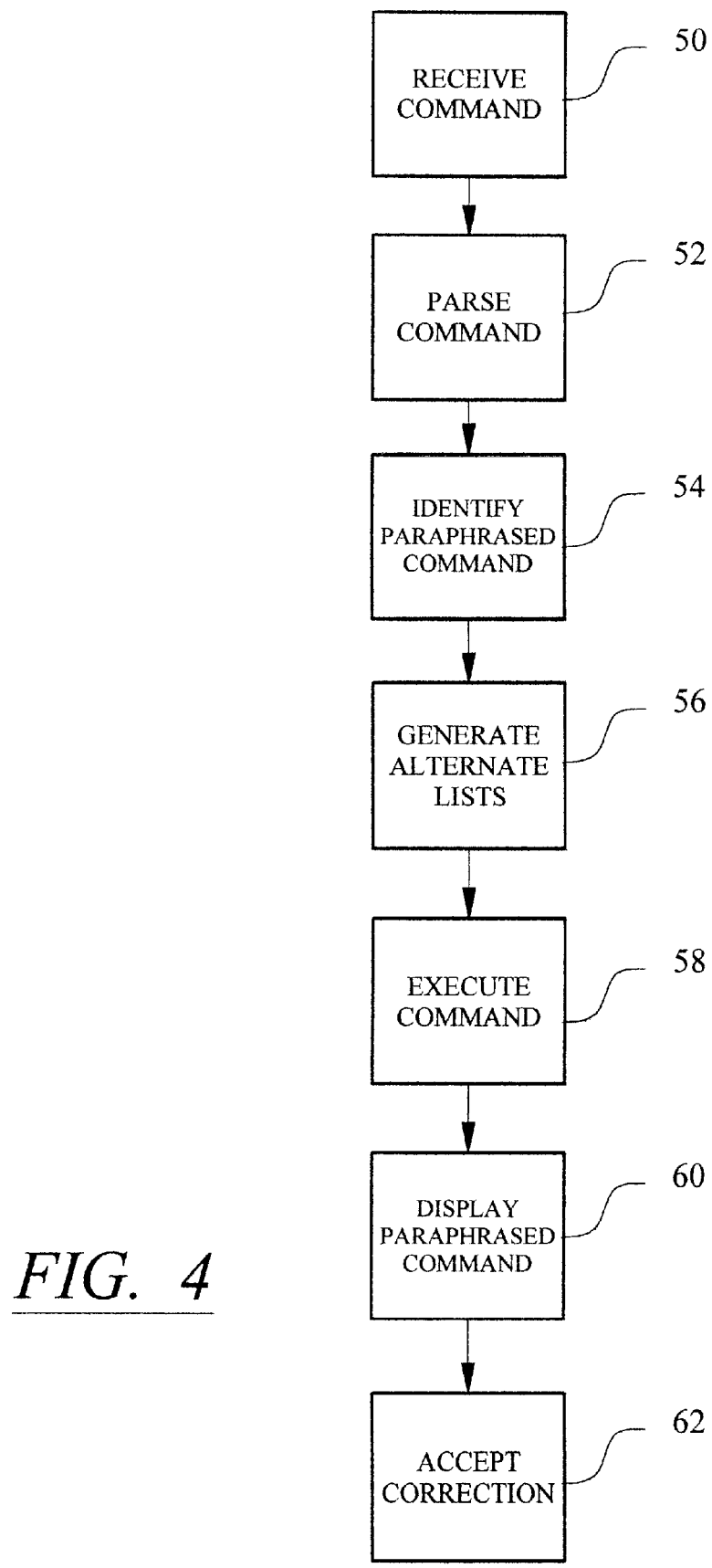
FIG. 4 is a flow chart showing the process for correcting incorrectly recognized commands by a speech recognition according to a preferred embodiment of the present invention.

Referring now to FIG. 4, the method and system of the present invention begins at step 50 by receiving a user input corresponding to a command. The user input is directed to the speech recognition application engine application 32 and can include navigation or other event-performing commands for controlling a speech-enabled application program. The input speech commands are recognized as described above.

Then at step 52, a parsing algorithm is executed to parse the recognized speech command. Specifically, the received command is broken down or segmented into predefined grammatical command language categories. In a preferred embodiment of the invention, such categories include a command action category, an action object category and a modifier category. However, the invention is not limited in this regard as more or less categories may be used. The categories are intended to mirror grammatical parts of speech and are analogous to verbs, nouns, and adjectives or adverbs, respectively. Words not falling within these categories, or parts of speech, are disregarded.

For a given command, the system of the present invention parses the spoken command for words indicating what action to take. These include words such as "open", "move", "get", "copy", "nudge", "start", etc. When such an action word is found, it is classified under the action category. Similarly, the system parses the received command for the object of the action, such as "file", "document", "word", "sentence", "window", etc, and classifies it accordingly. The same is done for modifying terms such as "up", "down", "left", "right", etc.

By way of example, assume the user of a word processor application issues the command, "would you be a dear and nudge that word to the right?" This command is then parsed and the word "nudge" is classified as the action, "word" as the object of the nudging, and "right" as modifying the nudging.

At step 54, once the critical terms have been appropriately classified, a paraphrased command is identified. An algorithm is executed to compare the critical terms to a known command grammar that is stored in memory 16. As can be appreciated by those skilled in the art, this can be any suitable procedure that is capable of taking a given phrase, determining its functional expression or result and searching the set of all functional expressions permitted in the grammar to identify speech phrases that could produce that functional expression. One approach involves the use of translation or rewrite rules, as are known in the art. For systems that do not support translation rules, different methods of producing the function expressed in the natural commands phrase would be required.

Thus, a paraphrased command for the above example could be "move" "word" "right".In this example, assume that the system located "word" and "right" in the known command grammar and equated the spoken action "nudge" with the known action command "move".The paraphrased command remains segmented according to the categories in which the terms are classified.

At step 56, alternate action, object and modifier commands are ascertained. The alternate commands are generated in the event the paraphrased command, or segments thereof, is not what the user intended. This may result from the spoken command being incorrectly interpreted in the recognition process, which may occur because of inaccurate modeling or improper speaking techniques of the user. Or, the spoken command may be unknown or closely resemble another known command so that it was incorrectly identified in the identification process of step 54. It will be appreciated by those skilled in the art that the precise mechanism for identifying the alternate phrases can vary and any suitable technique may be used.

Figure 5:
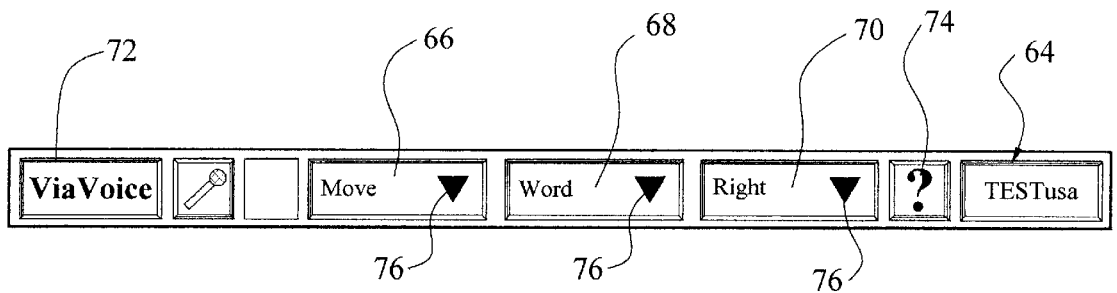
FIG. 5 is an exemplary embodiment of a graphical user interface (GUI) of the present invention.

At step 58, the paraphrased command is executed, and at step 60 it is displayed for the user on the video monitor 26 in a suitable user interface window, such as the exemplary window 64 shown in FIG. 5. Such an interface window is displayed after the command is dictated to provide feedback regarding the recognized commands. Preferably, the interface window is displayed without activation by the user. However, the present invention is not so limited as the window can be displayed as an icon or menu item on the users display so as to be initiated by the user with another input devices. Also, the paraphrased command can be initially conveyed to the user in any way, including audibly, provided at some point a display window can be generated for correcting incorrectly recognized commands.

Referring still to FIG. 5, the exemplary window 64 has a text box for each segment of the paraphrased command, including an action text box 66, object text box 68 and modifier text box 70. The window 64 also includes a command button 72, or other command-activating means such as a menu, for executing the corrected paraphrased command (as disclosed below) as well as a help button 74 for displaying instructional text for the user, as is known in the art. These buttons, however, are not necessary to practice the present invention. The terms comprising the paraphrased commands are displayed in their respective category text boxes 66, 68, 70, as shown in FIG. 5 using the move-word-right example described above. Preferably, the categories of each paraphrased command are displayed in a consistent order, such as [action][object]-[object]-[modifier].

Figure 6:
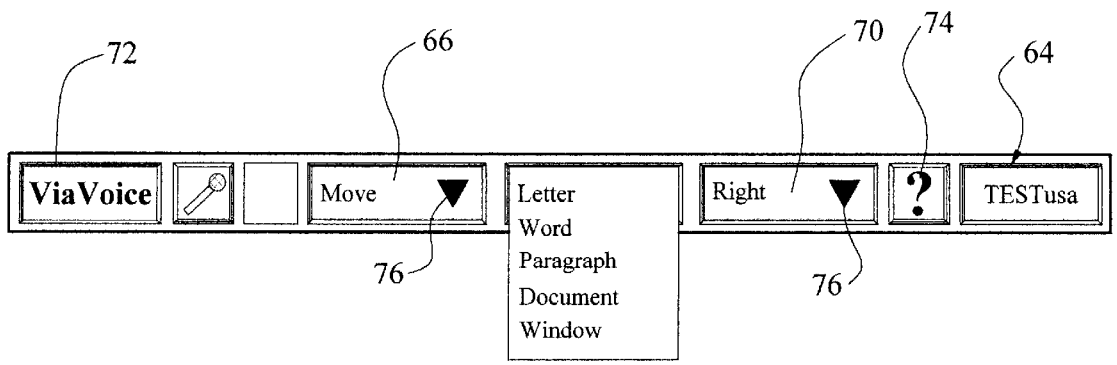
FIG. 6 shows the GUI of FIG. 5, having an exemplary drop-down window containing alternate commands.

Referring again to FIG. 4, at step 62, the system of the present invention allows the user to correct the displayed paraphrased command if it is incorrect. Preferably, the text boxes 66, 68, 70 can be accessed by a keyboard 18, pointing device 20 or voice commands to correct one or more command segments. Once accessed, the user can type or speak a new command in one or more of the text boxes without re-dictating the entire command. Alternatively, the user can activate an ancillary window or interface containing the alternate voice commands generated in process step 56, preferably, by pointing and clicking on the word, an icon 76 or anywhere within one of the text boxes. The invention is not limited in this regard, however, as the keyboard 18, a stylus (not shown), microphone 22 or other input device may also be used. Also, the alternative voice commands can be displayed as a pop-up text window, a floating text window or a drop-down menu (as shown in FIG. 6).

Continuing with the move-word example, assume that the user said "window" instead of "word." In this case, the user would first undo the prior unintended command by issuing an "undo" command by any suitable means. Then, for example, the user could quickly point and click on "word" in the object text box and select "window" from the pop-up alternative command window. The corrected command could then be executed without additional steps by the user or upon activation of the command button 72. The corrected command is then sent as a functional text phrase to an application, such as a word processor or the voice navigator application 34, to perform the desired function.

Correcting an incorrectly recognized command segment by selecting an alternative is fast and simple and reduces errors in the correction process. Moreover, unlike many other list-based correction techniques, the present invention reduces the ordinarily large number of word combinations to several small sets, which is particularly valuable in NLU systems. Thus, the alternate commands are easily perused and do not utilize a lot of memory and processing power, so that this invention may be operated in conventional embedded systems having minimal memory and display capabilities. The alternate commands can also be used by novice users to learn available commands in speech recognition systems without natural language understanding. Additionally, the correction technique of the present invention is also useful to improve the command recognition accuracy of the system. It can help a user determine if the failure of the speech system to recognize a particular phrase is due to the phrase not being in the active grammar or due to some other cause.

The referenced figures and the above description describe a straightforward command having one action, one object and one modifier. The correction techniques of the present invention can be used, however, for commands containing no terms, or multiple terms, in each category. For example, a user may issue the command, "please get me a copy of the current document" intending to have the current document printed out in hard-copy. In this case, there would be two actions terms "get" and "copy".Preferably, the system of the present invention will limit the command to the last spoken action and display the misinterpreted paraphrased command "copy" "document" "current".Executing this command copies to the "clip-board" the contents of the currently open document. The present invention allows the user to point to the word "copy", select the alternate action command "print" from a pop-up window, and have the current document printed. Also, a similar process would have occurred if the "open" was taken as the action. In either case, this technique is much more efficient than repeating the command multiple times or in multiple forms until a command is executed, particularly if the executed command is not the intended command.

While the foregoing specification illustrates and describes the preferred embodiments of the invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

We claim:

1. In a computer system adapted for speech recognition, a method for correcting an incorrectly recognized spoken command, comprising the steps of:

receiving said command from a user;

parsing said command to identify a paraphrased command;

displaying said paraphrased command to the user in a segmented format; and accepting corrections of said paraphrased command from said user on a per segment basis without requiring said user to re-dictate said command entirely.

2. The method according to claim 1, wherein said computer system is adapted to recognize natural language and said spoken command is a natural language command.

3. The method according to claim 1, wherein said paraphrased command is segmented according to command language categories.

4. The method according to claim 3, wherein said command language categories include at least one of:

a command action category indicating an action to be performed;

an action object category indicating an application element subjected to said event; and a modifier category indicating modifications to said action or said application element.

5. The method according to claim 3, wherein each command language segment of said paraphrased command is displayed in a user interface window.

6. The method according to claim 3, further comprising the step of identifying alternative voice commands for each command language segment of said paraphrased command.

7. The method according to claim 6, wherein said alternative voice commands are displayed in a user interface window as one of a pop-up text window, a floating text window and a drop-down menu in response to prompting by an input device.

8. A computer speech recognition system having a simple means for correcting an incorrectly recognized spoken command, comprising:

means for receiving said command from a user;

process means for recognizing and parsing said command to identify a paraphrased command;

monitor means for displaying said paraphrased command to the user in a segmented format; and input means for accepting corrections of said paraphrased command from said user on a per segment basis without requiring said user to re-dictate said command entirely.

9. The system as recited in claim 8, wherein said computer system is adapted to recognize natural language and said spoken command is a natural language command.

10. The system as recited in claim 8, wherein said paraphrased command is segmented according to command language categories.

11. The system as recited in claim 10, wherein said command language categories include at least one of:
   a command action category indicating an action to be performed;
   an action object category indicating an application element subjected to said event; and
   a modifier category indicating modifications to said action or said application element.

12. The system as recited in claim 10, wherein each command language segment of said paraphrased command is displayed in a user interface window.

13. The system as recited in claim 10, further comprising the step of identifying alternative voice commands for each command language segment of said paraphrased command.

14. The system as recited in claim 13, wherein said alternative voice commands are displayed in a user interface window as one of a pop-up text window, a floating text window and a drop-down menu in response to prompting by an input device.

15. A machine readable storage, having stored thereon a computer program having a plurality of code sections executable by a machine for causing the machine to perform the steps of:
   receiving a spoken command from a user;
   parsing said command to identify a paraphrased command;
   displaying said paraphrased command to the user in a segmented format; and
   accepting corrections of said paraphrased command from said user on a per segment basis without requiring said user to re-dictate said command entirely.

* * * * *